United States Patent
Jenkins et al.

(10) Patent No.: US 10,858,833 B2
(45) Date of Patent: Dec. 8, 2020

(54) ROOFING SHINGLE

(71) Applicant: CERTAINTEED CORPORATION, Malvern, PA (US)

(72) Inventors: Robert L. Jenkins, Honey Brook, PA (US); Alex C. Nash, Ridley Park, PA (US); Gregory F. Jacobs, Oreland, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 15/473,914

(22) Filed: Mar. 30, 2017

(65) Prior Publication Data

US 2017/0284100 A1    Oct. 5, 2017

Related U.S. Application Data

(60) Provisional application No. 62/317,065, filed on Apr. 1, 2016.

(51) Int. Cl.
*E04D 1/26* (2006.01)
*B32B 7/12* (2006.01)
(Continued)

(52) U.S. Cl.
CPC ............... *E04D 1/26* (2013.01); *B32B 3/085* (2013.01); *B32B 5/022* (2013.01); *B32B 5/024* (2013.01);
(Continued)

(58) Field of Classification Search
CPC ....... E04D 1/26; E04D 1/28; E04D 2001/005; B32B 7/12; B32B 5/30; B32B 2419/06
(Continued)

(56) References Cited

U.S. PATENT DOCUMENTS 1,776,949 A    9/1930   Lumbard
2,161,440 A *  6/1939   Venrick ................... E04D 1/26
                                                      52/553
(Continued)

FOREIGN PATENT DOCUMENTS

RU              96310        12/2015

OTHER PUBLICATIONS

CertainTeed Corporation, (Dec. 2010). "CertainTeed Independence™ Designer Shingles" [Brochure]. Valley Forge, PA: Author.
(Continued)

*Primary Examiner* — Brent W Herring
(74) *Attorney, Agent, or Firm* — Abel Schillinger, LLP; Thomas H. Osborn

(57) ABSTRACT

A roofing shingle including a lower layer including a headlap and a plurality of tabs extending from the headlap, and an upper layer including one or more fingers, wherein the one or more fingers are disconnected from one another, and wherein each of the one or more fingers is disposed on one tab of the plurality of tabs, wherein a number of the plurality of tabs is different than a number of the one or more fingers. In an embodiment, the lower layer is a lowermost layer of the roofing shingle. In another embodiment, the roofing shingle further includes an alignment feature disposed in an exposure zone of the roofing shingle, wherein the alignment feature is adapted to permit alignment of adjacent roofing shingles during installation on a roof.

7 Claims, 5 Drawing Sheets

(51) Int. Cl.

| | | |
|---|---|---|
| *B32B 5/30* | (2006.01) | |
| *B32B 5/16* | (2006.01) | |
| *B32B 7/08* | (2019.01) | |
| *E04D 1/20* | (2006.01) | |
| *B32B 5/02* | (2006.01) | |
| *B32B 11/12* | (2006.01) | |
| *B32B 5/14* | (2006.01) | |
| *B32B 3/08* | (2006.01) | |
| *E04D 1/28* | (2006.01) | |

(52) U.S. Cl.
   CPC ............. *B32B 5/028* (2013.01); *B32B 5/142* (2013.01); *B32B 5/16* (2013.01); *B32B 5/30* (2013.01); *B32B 7/08* (2013.01); *B32B 7/12* (2013.01); *B32B 11/12* (2013.01); *E04D 1/20* (2013.01); *B32B 2250/02* (2013.01); *B32B 2250/44* (2013.01); *B32B 2262/0246* (2013.01); *B32B 2262/0253* (2013.01); *B32B 2262/0269* (2013.01); *B32B 2262/0276* (2013.01); *B32B 2262/101* (2013.01); *B32B 2262/14* (2013.01); *B32B 2307/402* (2013.01); *B32B 2307/558* (2013.01); *B32B 2307/732* (2013.01); *B32B 2419/06* (2013.01); *E04D 1/28* (2013.01)

(58) Field of Classification Search
   USPC ............................ 52/557, 558, 559, 554, 518
   See application file for complete search history.

(56) References Cited

U.S. PATENT DOCUMENTS

| | | | |
|---|---|---|---|
| 2,245,062 A | 6/1941 | Abraham | |
| 2,863,405 A * | 12/1958 | Leibrook | E04D 1/26 156/247 |
| 2,935,416 A * | 5/1960 | Dunbar | E04D 1/26 106/271 |
| 3,247,631 A * | 4/1966 | Lovness | E04D 1/26 156/71 |
| 3,407,556 A * | 10/1968 | Leibrook | E04D 1/26 52/559 |
| 3,624,975 A * | 12/1971 | Morgan et al. | E04D 1/26 52/105 |
| 3,927,501 A * | 12/1975 | Allen | E04D 1/26 52/555 |
| 4,499,702 A * | 2/1985 | Turner | E04D 1/26 52/555 |
| D300,257 S | 3/1989 | Stahl | |
| D309,027 S | 7/1990 | Noone et al. | |
| D313,278 S | 12/1990 | Noone | |
| D313,658 S | 1/1991 | Noone | |
| 5,181,361 A | 1/1993 | Hannah et al. | |
| 5,209,802 A | 5/1993 | Hannah et al. | |
| D336,347 S | 6/1993 | Hannah et al. | |
| 5,232,530 A * | 8/1993 | Malmquist | E04D 1/26 156/182 |
| D340,294 S | 10/1993 | Hannah et al. | |
| D347,900 S | 6/1994 | Stapleton | |
| 5,369,929 A | 12/1994 | Weaver et al. | |
| 5,397,460 A | 3/1995 | Koblanski | |
| 5,421,134 A | 6/1995 | Hannah et al. | |
| D366,124 S | 1/1996 | Hannah et al. | |
| D369,421 S | 4/1996 | Kiik et al. | |
| D375,563 S | 11/1996 | Hannah et al. | |
| 5,571,596 A * | 11/1996 | Johnson | B32B 5/28 428/143 |
| D376,660 S | 12/1996 | Hannah et al. | |
| 5,822,943 A | 10/1998 | Frankoski et al. | |
| D401,362 S | 11/1998 | Bondoc et al. | |
| 5,860,263 A * | 1/1999 | Sieling | E04D 1/26 52/518 |
| 6,038,827 A * | 3/2000 | Sieling | E04D 1/26 428/143 |
| 6,145,265 A | 11/2000 | Malarkey et al. | |
| 6,220,329 B1 * | 4/2001 | King | B32B 3/02 144/13 |
| 6,361,851 B1 | 3/2002 | Sieling et al. | |
| 6,397,546 B1 | 6/2002 | Malarkey et al. | |
| 6,457,290 B1 * | 10/2002 | Elliott | E04D 1/26 427/188 |
| 6,544,374 B2 * | 4/2003 | King | B32B 3/02 144/13 |
| 6,715,252 B2 | 4/2004 | Stahl et al. | |
| D504,962 S | 5/2005 | Sieling et al. | |
| 6,933,037 B2 | 8/2005 | McCumber et al. | |
| 7,204,063 B2 * | 4/2007 | Kandalgaonkar | E04D 1/26 428/143 |
| D552,267 S | 10/2007 | Kalkanoglu | |
| D554,275 S | 10/2007 | Sieling et al. | |
| 7,510,622 B2 | 3/2009 | Kalkanoglu et al. | |
| 7,665,261 B2 | 2/2010 | Elliott et al. | |
| D611,620 S | 3/2010 | Kalkanoglu et al. | |
| 7,805,905 B2 | 10/2010 | Rodrigues et al. | |
| 7,827,753 B2 * | 11/2010 | Nagarajan | B32B 5/26 52/560 |
| 7,877,949 B1 * | 2/2011 | Elliott | E04D 1/26 52/314 |
| D644,753 S | 9/2011 | Elliott | |
| 8,168,880 B2 | 5/2012 | Jacobs et al. | |
| 8,240,100 B2 | 8/2012 | Kalkanoglu et al. | |
| D669,602 S | 10/2012 | Jenkins | |
| D670,007 S | 10/2012 | Jenkins | |
| 8,438,812 B2 | 5/2013 | King et al. | |
| 8,468,754 B2 | 6/2013 | Railkar et al. | |
| 8,522,510 B2 * | 9/2013 | Elliott | D06N 5/00 52/554 |
| 8,713,860 B2 | 5/2014 | Railkar et al. | |
| 8,789,332 B1 | 7/2014 | Halliley et al. | |
| 8,915,037 B2 * | 12/2014 | Jenkins | E04D 1/26 52/420 |
| 8,968,507 B2 * | 3/2015 | Elliot | D06N 5/00 156/260 |
| 9,021,760 B2 | 5/2015 | Kiik et al. | |
| 9,121,178 B2 | 9/2015 | Belt et al. | |
| 9,140,012 B1 | 9/2015 | Leitch et al. | |
| 9,187,903 B1 | 11/2015 | Buzza | |
| D750,810 S | 3/2016 | Buzza | |
| 9,279,255 B2 | 3/2016 | Bryson et al. | |
| 9,290,944 B2 | 3/2016 | Kalkanoglu et al. | |
| D762,879 S | 8/2016 | Leitch | |
| D762,880 S | 8/2016 | Leitch | |
| D762,881 S | 8/2016 | Leitch | |
| D763,470 S | 8/2016 | Leitch | |
| D763,471 S | 8/2016 | Leitch | |
| 9,464,439 B2 * | 10/2016 | Buzza | E04D 1/12 |
| 9,739,062 B2 * | 8/2017 | Leitch | E04D 1/28 |
| D799,721 S | 10/2017 | Leitch | |
| 9,808,947 B2 | 11/2017 | Grubka et al. | |
| D805,221 S | 12/2017 | Leitch | |
| D815,760 S | 4/2018 | Nash et al. | |
| D868,295 S * | 11/2019 | Nash | D25/139 |
| 2004/0079042 A1 | 4/2004 | Elliott | |
| 2004/0168761 A1 * | 9/2004 | Phillips | B05D 5/061 156/260 |
| 2005/0072109 A1 * | 4/2005 | Elliott | D06N 5/00 52/741.1 |
| 2005/0193673 A1 * | 9/2005 | Rodrigues | B32B 3/06 52/518 |
| 2005/0204675 A1 * | 9/2005 | Snyder | B32B 11/02 52/555 |
| 2006/0179767 A1 * | 8/2006 | Miller | B32B 3/08 52/555 |
| 2007/0251571 A1 * | 11/2007 | Jacobs | E04D 1/26 136/256 |
| 2008/0005995 A1 * | 1/2008 | Elliott | E04D 1/26 52/557 |
| 2009/0139175 A1 * | 6/2009 | Todd | E04D 1/205 52/557 |

(56) References Cited

U.S. PATENT DOCUMENTS

| | | | |
|---|---|---|---|
| 2010/0205898 A1* | 8/2010 | Rodrigues | B32B 3/06 52/745.19 |
| 2010/0313512 A1* | 12/2010 | Rodrigues | B32B 3/06 52/559 |
| 2011/0056148 A1 | 3/2011 | Jenkins et al. | |
| 2011/0209428 A1* | 9/2011 | Elliott | E04D 1/26 52/526 |
| 2012/0174505 A1* | 7/2012 | Jacobs | E04D 1/26 52/173.3 |
| 2012/0174517 A1* | 7/2012 | Jenkins | E04D 1/26 52/553 |
| 2013/0019554 A1 | 1/2013 | Rodrigues et al. | |
| 2013/0025768 A1* | 1/2013 | Vermilion | E04D 1/26 156/85 |
| 2014/0090329 A1* | 4/2014 | Elliott | D06N 5/00 52/535 |
| 2015/0152642 A1* | 6/2015 | Elliott | D06N 5/00 52/540 |
| 2015/0315789 A1* | 11/2015 | Buzza | E04D 1/20 52/526 |
| 2015/0315790 A1* | 11/2015 | Buzza | E04D 1/12 52/559 |
| 2015/0368904 A1* | 12/2015 | Humphreys | E04D 1/26 428/143 |
| 2016/0017607 A1 | 1/2016 | Kalkanoglu et al. | |
| 2016/0145871 A2* | 5/2016 | Buzza | E04D 1/12 52/559 |
| 2016/0177569 A1* | 6/2016 | Leitch | E04D 1/28 52/559 |

OTHER PUBLICATIONS

CertainTeed Corporation, (2015) "Independence™ Shingles" [Technical Data Sheet], 2 pgs. Valley Forge, PA: Author.

\* cited by examiner

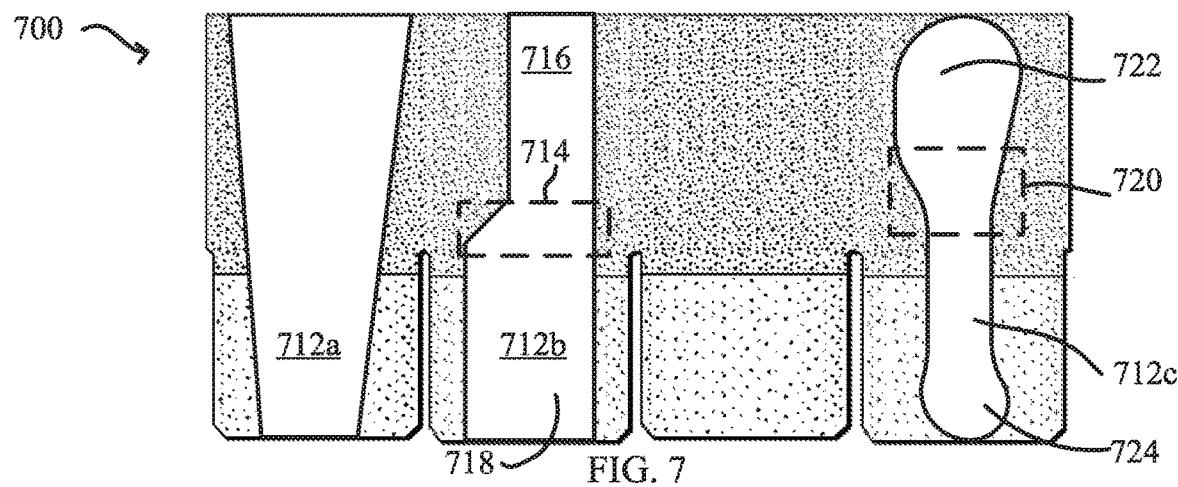
FIG. 7
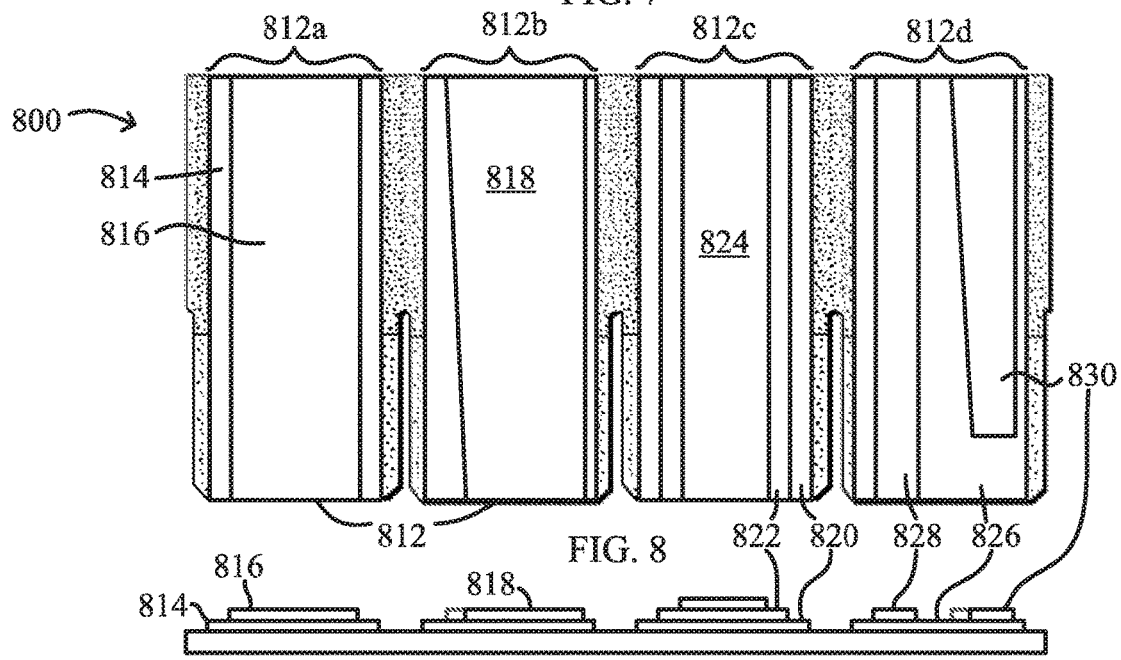
FIG. 8
FIG. 9
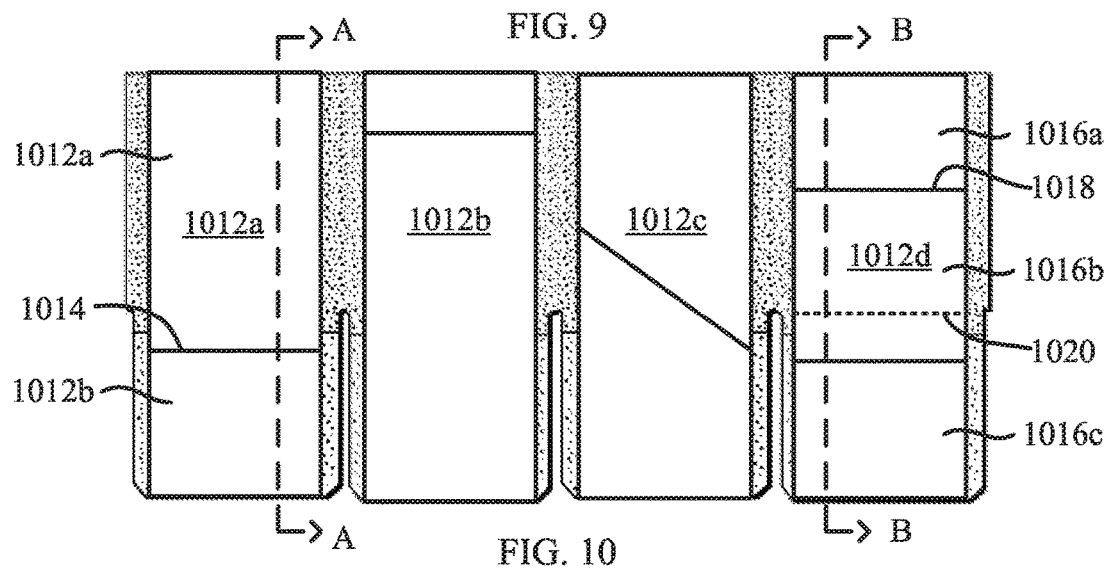
FIG. 10

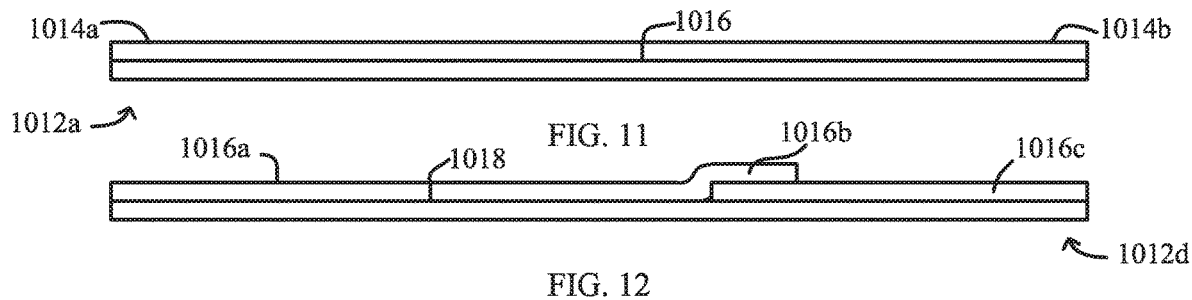
FIG. 11
FIG. 12
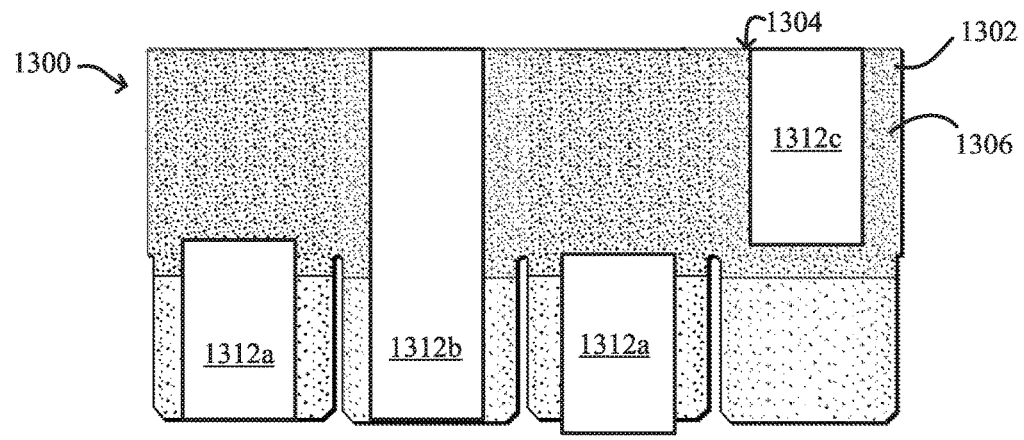
FIG. 13
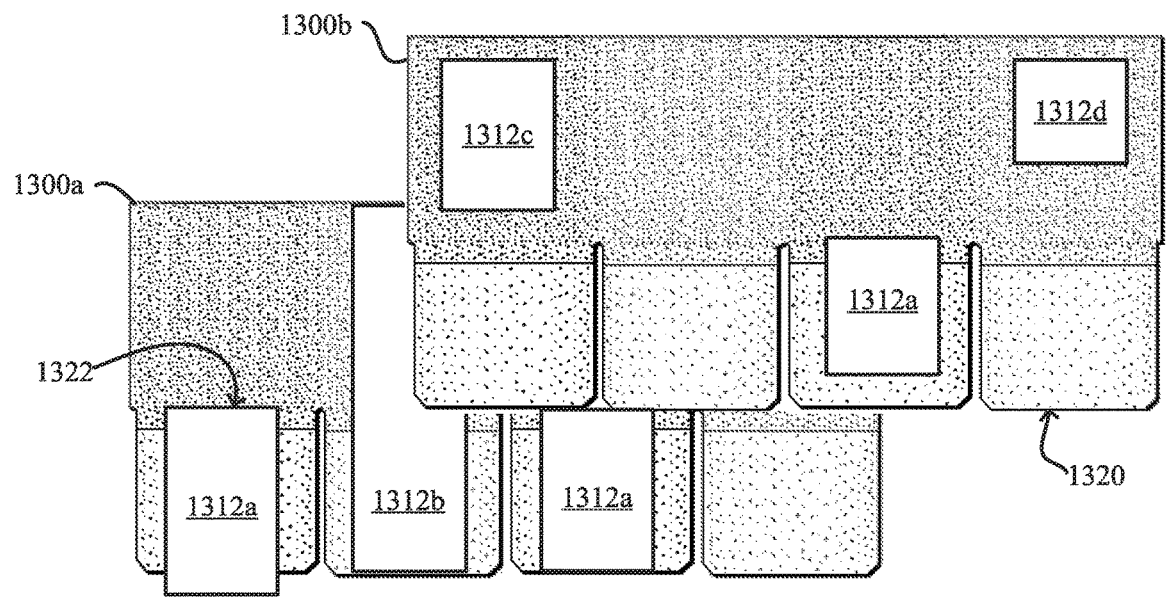
FIG. 14

ROOFING SHINGLE

CROSS-REFERENCE TO RELATED APPLICATION

This application claims priority under 35 U.S.C. § 119(e) to U.S. Provisional Application No. 62/317,065, entitled "ROOFING SHINGLE," by Robert L. Jenkins et al., filed Apr. 1, 2016, which is assigned to the current assignee hereof and is incorporated herein by reference in its entirety.

FIELD OF THE INVENTION

The present disclosure relates to roofing shingles.

RELATED ART

Roofing shingles typically include flat, rectangular shaped elements arranged in an overlapping configuration on a roof to protect a structure from elemental damage. Roofing shingles may include various materials, such as wood, slate, stone, ceramic, fiber, metal, plastic, composite, or asphalt.

In addition to protecting structures, roofing shingles provide aesthetic value. Shingle manufacturers have long recognized the structural and aesthetic aspects of shingles and continue to demand improved roofing shingles.

BRIEF DESCRIPTION OF THE DRAWINGS

Embodiments are illustrated by way of example and are not limited in the accompanying figures.

FIGS. 4 to 8 include front elevation views of roofing shingles in accordance with embodiments described herein.

FIG. 9 includes a front side elevation view of a roofing shingle in accordance with an embodiment.

FIG. 10 includes a front elevation view of a roofing shingle in accordance with an embodiment.

FIG. 11 includes a cross-sectional elevation view of a shingle in accordance with an embodiment as seen along Line A-A in FIG. 10.

FIG. 12 includes a cross-sectional elevation view of a shingle in accordance with an embodiment as seen along Line B-B in FIG. 10.

FIG. 13 includes a front elevation view of a roofing shingle in accordance with an embodiment.

FIG. 14 includes a front elevation view of an array of roofing shingles in accordance with an embodiment.

Figure 1:
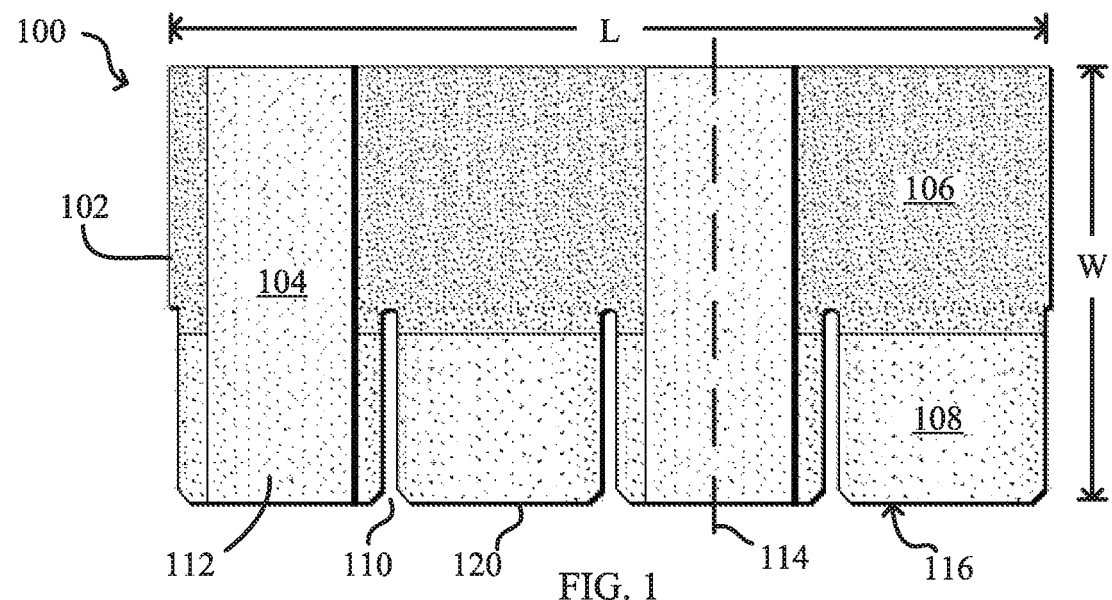
FIG. 1 includes a front elevation view of a roofing shingle in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Aspects of the drawings include different shading of individual layers or portions, which is not intended to signify particular color value or intensity but only to indicate color contrasts between layers or along the same layer. The shading is optional and does not need to be applied. Further, reference to different shaded granules and depiction thereof in the drawings is not intended to signify that the invention is limited to roofing shingles with such an arrangement of granules, or granules in general. Rather, the shaded granules are optional and need not be applied.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing shingle arts.

Roofing shingles in accordance with embodiments described herein generally include a lower layer and an upper layer. The lower layer can include a headlap and a plurality of tabs extending from the headlap. The upper layer can include one or more fingers disconnected from one another. The one or more fingers can be arranged along an upper surface of the lower layer—particularly, along the tabs and headlap. In an embodiment, each tab of the lower layer can include no more than one finger, but certain tabs may be free, or essentially free, (such as devoid) of a finger. In certain embodiments, at least one of the fingers can extend across an entire width of the lower layer. In other embodiments, at least one of the fingers can extend a distance different than the width of the lower layer, such as less than the width of the lower layer. An impact resistant material can be coupled to the lower layer of the roofing shingle, providing dampening against impacting objects.

Figure 2:
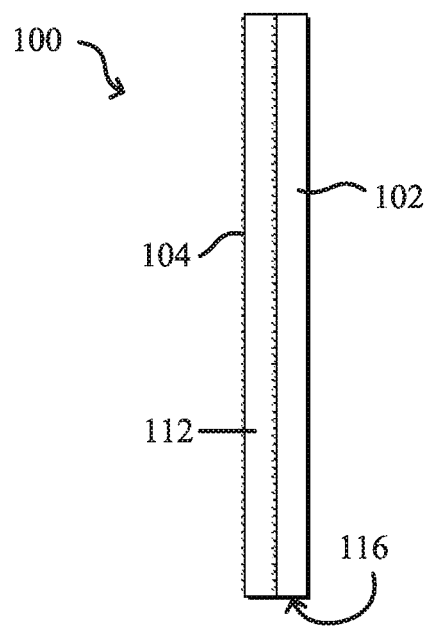
FIG. 2 includes a side elevation view of the roofing shingle in accordance with an embodiment.
Figure 3:
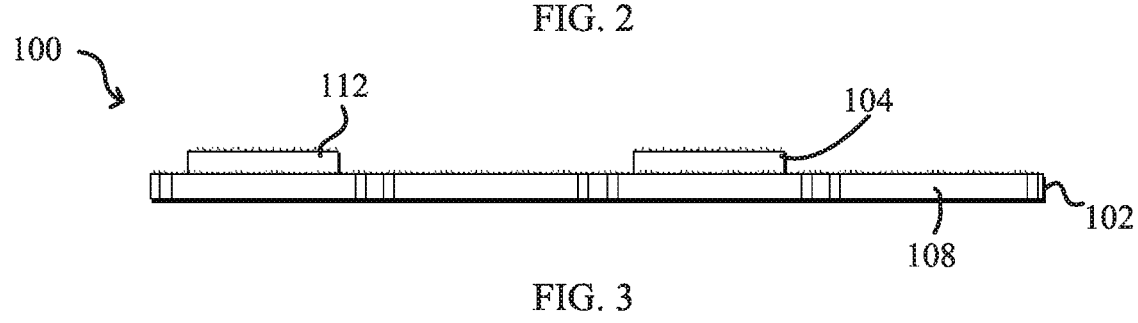
FIG. 3 includes a front side elevation view of the roofing shingle in accordance with an embodiment.

Referring to FIGS. 1 to 3, a roofing shingle 100 (hereinafter, "shingle") in accordance with embodiments described herein generally includes a lower layer 102 and an upper layer 104. In an embodiment, the lower layer 102 forms a lowermost layer of the shingle 100. In another embodiment, the upper layer 104 forms an uppermost layer of the shingle 100. In a particular instance, the shingle 100 can be free, or essentially free, (such as devoid) of additional layers such as a tertiary layer along the lowermost surface of the lower layer 102, along the uppermost surface of the upper layer 104, or along both the lowermost surface of the lower layer 102 and the uppermost surface of the upper layer 104. In another instance, one or more elements can be positioned along the lowermost surface of the lower layer 102, along the uppermost surface of the upper layer 104, or along both the lowermost surface of the lower layer 102 and the uppermost surface of the upper layer 104. Examples of laminated shingle configurations are described in U.S. Pat. No. 6,145,265, which is incorporated herein in its entirety.

The lower layer 102 can include a headlap 106 extending along a length, L, and at least partially along a width, W, of the shingle 100 and one or more tabs 108 extending from the headlap 106. The headlap 106 can be polygonal such as rectangular, or generally rectangular. Installed, the headlap 106, or a portion thereof, is typically covered by an overlying shingle 100.

In an embodiment, the lower layer 102 includes only one tab 108 extending between a left edge and a right edge of the shingle 100. That is, the shingle 100 may be free, or essentially free, of slots otherwise separating adjacent tabs. In another embodiment, the lower layer 102 includes a plurality of tabs 108, such as two tabs, three tabs, four tabs, or five tabs extending from the headlap 106. In another embodiment, the lower layer 102 can include more than five tabs, such as at least six tabs, at least seven tabs, at least eight tabs, at least nine tabs, or even at least ten tabs. In a particular embodiment, the tabs 108 can all extend equidistance from the headlap 106. The tabs 108 can extend at least 5% of the width, W, of the shingle 100, such as at least 10% W, at least 20% W, at least 30% W, at least 40% W, or even at least 50% W. In an embodiment, the tabs 108 extend less than W, such as less than 99% W, less than 90% W, less than 80% W, less than 70% W, or less than 60% W.

Figure 4:
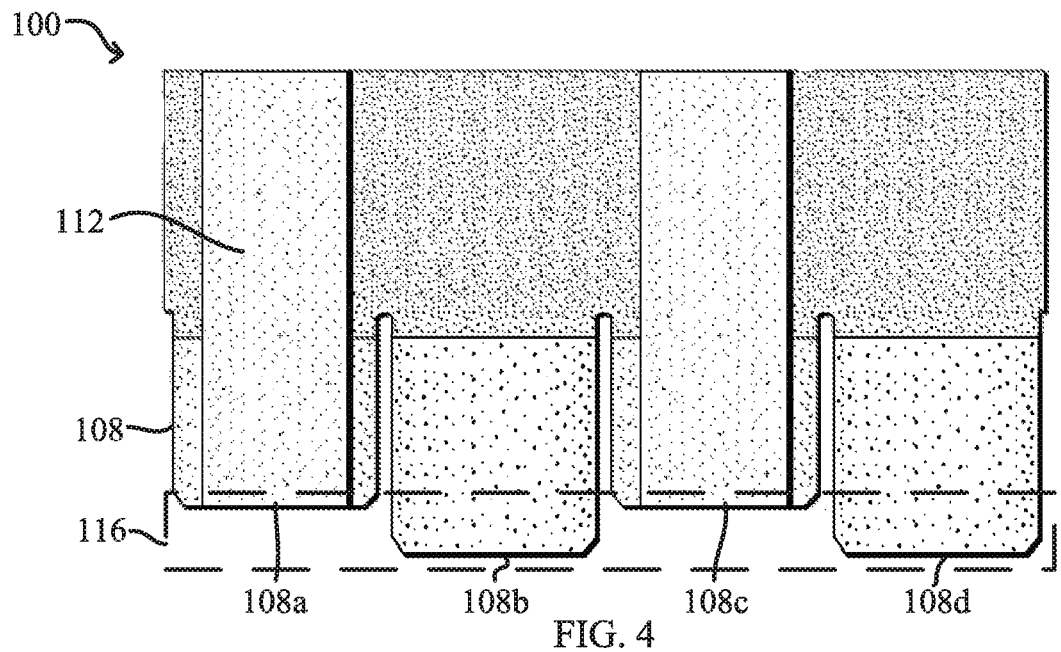

Referring to FIG. 4, in an embodiment, the tabs 108 can extend different distances from the headlap 106 toward a butt end 116 of the shingle 100. In some embodiments, the butt end 116 may be variegated. As used herein, "variegated" refers to an irregular edge that is non-symmetrical and which may have multiple or variable widths. Variegated butt ends may be rectilinear, non-linear, or not co-linear. A variegated butt end 116 may be discontinuous, including one or more slots, as discussed below. In other embodiments, the butt end 116 does not have slots and is not sectioned or interrupted into smaller portions either wholly or partially by such features. In addition, the butt end 116 may have at least one edge portion that is straight, curved or has other geometric shape, profile or design, or is a combination of multiple geometric shapes.

Referring again to FIGS. 1 to 3, the tabs 108 can extend from the headlap 106 in a uniform, or generally uniform, direction with respect to one other. Adjacent tabs 108 can be spaced apart by slots 110 extending parallel, or generally parallel, with the width, W, of the shingle 100. In certain embodiments, the slots 108 can have uniform characteristics with respect to one another. For example, the slots 108 can all have a same width, as measured parallel with the width, W, of the shingle 100, a same length, as measured perpendicular to the width, W, a same area, a same shape as compared to one another, or a combination thereof. In an embodiment, at least one of the slots 110 can extend past the tabs 108 into the headlap 106. In a particular instance, the at least one slot 110 can extend at least 1% into the headlap's width, at least 5% into the headlap's width, at least 10% into the headlap's width, or even at least 25% of the headlap's width. In another instance, the at least one slot 110 can extend no greater than 75% the width of the headlap, no greater than 50% of the width of the headlap, or no greater than 30% the width of the headlap. In an embodiment, at least one of the slots 110 can extend a different distance into the headlap 106 than a slot 110 along the same or different shingle 100. In a different embodiment, all of the slots 110 can extend a same distance into the headlap 106. At least one of the slots 110 can terminate with a rounded end, a polygonal end, or an end having rounded and polygonal attributes. As illustrated in FIG. 1, the slot 110 can terminate at the butt end 116 of the shingle 100 with a flared opening. The flared opening can include tapered sides—expanding linearly or curvilinearly.

In an embodiment, at least one of the slots 110 is closed, or fully surrounded by portions of the lower layer 102. That is, the at least one slot 110 has a perimeter defined entirely by the lower layer 102, i.e., the slot is not open and does not terminate at the butt end 116. The at least one slot may terminate with a rounded end, a polygonal end, or an end having rounded and polygonal attributes at either, or both, ends. In a particular embodiment, the shingle 100 can include a combination of open and closed slots 110. In another particular embodiment, adjacent tabs 108 can be spaced apart by multiple slots 110, such as multiple closed slots. The closed slots can optionally all lie along a same line extending from the butt end 116 of the shingle 100 to the headlap 106.

In a particular instance, at least one, such as a plurality, of the slots 110 can be slits having no discernable length, as measured parallel with a length, L, of the shingle 100. Slits can break surface textures, changing aesthetic appearance of the shingle 100 without material removal.

In certain embodiments, the slots 110 can have different lengths as compared to one another, as measured parallel with the length, L, of the shingle 100. For example, a first slot can have a first length that is at least 101% the length of a second slot, at least 102% the length of the second slot, at least 103% the length of the second slot, at least 104% the length of the second slot, at least 105% the length of the second slot, at least 110% the length of the second slot, at least 150% the length of the second slot, or at least 200% the length of the second slot. In other embodiments, the slots 110 can have the same, or relatively similar, lengths as one another, as measured parallel with the length, L.

Shingles 100 in accordance with embodiments described herein can further include fingers 112 as part of the upper layer 104. As illustrated in FIG. 4, the first and third tabs 108a and 108c each include one finger 112 extending entirely from the headlap 106 to the butt end 116 of the respective tab 108a and 108c while the second and fourth tabs 108b and 108d are free, or essentially free, of fingers 112. The disclosure is not intended to be limited to this exemplary configuration. In another embodiment, the first and fourth tabs 108a and 108d can each include one finger 112 while the second and third tabs 108b and 108c are free of fingers 112. In a further embodiment, the first and second tabs 108a and 108b can each include one finger 112 while the third and fourth tabs 108c and 108d are free of fingers. In yet another embodiment, the second and third tabs 108b and 108c can each include one finger while the first and fourth tabs 108a and 108d are free of fingers 112. In another embodiment, the first, second, and third tabs 108a, 108b, and 108c can each include one finger 112 while the fourth tab 108d is free of fingers 112. Other arrangements between tabs 108 and fingers 112 are also contemplated by this disclosure.

By way of a non-limiting embodiment, the fingers 112 can be attached to the lower layer 102, for example, by an adhesive, mechanical fastener, mechanical deformation, threaded or non-threaded fasteners, or any combination thereof.

The upper layer 104 can include one or more fingers 112, such as for example, at least one finger, at least two fingers, at least three fingers, at least four fingers, or even at least five fingers. Each finger of the one or more fingers 112 can be aligned with a tab 108 of the lower layer 102. In an embodiment, each of the one or more fingers 112 is disposed on one tab 108. In another embodiment, each tab 108 includes no more than one finger 112. In certain embodiments, each tab 108 includes one finger 112. In certain embodiments, the total number of tabs 108 is different than the total number of fingers 112. That is, a ratio of the total number of tabs 108 to the total number of fingers is different than 1:1. For example, a ratio $[N_T:N_F]$ of the total number of tabs, $N_T$, to the total number of fingers, $N_F$, can be greater than 1:1, such as at least 1.1:1, at least 1.5:1, at least 1.75:1, or at least 2:1. The fingers 112 can be arranged along the tabs 108 in predetermined patterns (as discussed previously with respect to FIG. 4) or randomly distributed such that different shingles 100 include different finger arrangements.

The relative width of the tabs 108 and fingers 112 can be changed and altered from the exemplary embodiment illustrated in FIG. 4. For example, the first and fourth tabs 108a and 108d can have larger widths than the second and third tabs 108b and 108c. The second and third tabs 108b and 108c can be larger widths than the first and fourth tabs 108a and 108d. The first, second, and fourth tabs 108a, 108b, and 108d can have larger widths than the third tab 108c.

As illustrated in FIGS. 1 to 3, the fingers 112 along shingle 100 all have a generally rectangular shape including four generally orthogonal edges. Referring to FIG. 7, a shingle 700 in accordance with certain embodiments described herein can also include fingers 712 with non rectangular shapes. For example, at least one of the fingers 712a can include a taper or a tapered portion defined by a finger having a changing (varying) length, as measured along a width of the finger 712a. Finger length is parallel with shingle length, L, while finger width is parallel with shingle width, W.

The taper or tapered portion can taper linearly or curvilinearly, such as arcuately. As illustrated in FIG. 7, the taper can extend along the entire width of at least one of the fingers, e.g., finger 712a. Alternatively, the taper can extend less than the entire width of the finger. For example, finger 712b includes a tapered portion 714 disposed between two rectangular portions 716 and 718. The tapered portion 714 can extend less than 90% the width of the shingle, less than 80% the width of the shingle, less than 70% the width of the shingle, less than 60% the width of the shingle, less than 50% the width of the shingle, less than 40% the width of the shingle, less than 30% the width of the shingle, or less than 10% the width of the shingle. Finger 712c includes a tapered portion 720 disposed between two rounded portions 722 and 724. The rounded portions 722 and 724 can have a single origin or include segments formed with different origins. In a non-illustrated embodiment, at least one of the fingers can include a double-taper. That is, the finger can include two tapered portions. The tapered portions can abut one another or be spaced apart by an intermediary portion. The tapered portions can taper uniformly or have different profiles as compared to one another. The taper angle or taper style (linear or curvilinear) of different tapered portions can be the same or different as compared to one another.

In an embodiment, at least one of the fingers can have at least two tapered portions, at least three tapered portions, at least four tapered portions, or at least five tapered portions. The at least one finger can have no greater than 100 different tapered portions, no greater than 50 different tapered portions, or no greater than 10 different tapered portions. It should be understood that the finger arrangement in FIG. 7 is illustrative. The fingers disposed on a single shingle may have the same or different shapes as compared to one another, including other non-illustrated shapes.

FIGS. 8 and 9 illustrate embodiments of shingles 800 including fingers 812 each formed from multiple layers. The fingers 812 can include two layers, three layers, four layers, five layers, or any other number of suitable layers disposed adjacent, such as vertically aligned, with respect to one another. The layers can partially or fully overlap one another, forming localized areas of the shingle 800 with increased or decreased dimensional thickness. Such layering may enhance aesthetic presentation, reflecting light at different angles and intensities more closely simulating natural materials.

Finger 812a includes two vertically aligned layers 814 and 816 extending the entire width, W, of the shingle 800. The layers 814 and 816 have different lengths and lie along a mutual centerline. Finger 812b includes two layers similar to finger 812a, with the upper layer 818 instead having a canted, offset edge. The length of the upper layer 818 is greater at an end adjacent the headlap of the underlying lower layer than at the end adjacent to the butt end. As discussed above, the varying length of the finger 812b can occur linearly or curvilinearly and can include one or more tapered portions. Finger 812c includes three vertically aligned layers 820, 822, and 824. The layers are illustrated as aligned with one another, but can alternatively be offset from each other. As illustrated, the layers decrease in length away from the lower layer. Alternatively, the layers can have different profiles such that a first layer disposed over a second layer has a length less than the length of the second layer. The edges of the first layer can float, disconnected from the underlying layer at peripheries thereof or be bent toward the lower layer. Finger 812d includes a lower layer 826 and two upper layers 828 and 830. While upper layer 828 is rectangular, upper layer 830 has a tapering profile. Similarly, while upper layer 828 extends across the entire width of the shingle 800, upper layer 830 terminates a distance from the butt end of the shingle 800 so as to be spaced apart therefrom. As previously discussed, the above described embodiments are intended as merely exemplary. The scope of the disclosure is intended to cover fingers having various shapes, sizes, layers, and configurations other than those illustrated.

Referring to FIGS. 10 to 12, in accordance with one or more embodiments, at least one of the fingers 1012 includes a plurality of pieces or layers arranged along the shingle width, W. For example, finger 1012a includes two orthogonal pieces 1014a and 1014b abutting at a joint 1016 disposed over a tab of the lower layer. Finger 1012b includes two orthogonal pieces abutting at a joint on the headlap of the lower layer. Finger 1012c includes two polygonal, non-orthogonal pieces abutting at a joint disposed over a portion of the headlap and a portion of a tab of the lower layer. The joint is canted relative to the width of the shingle. Finger 1012d includes three orthogonal pieces 1016a, 1016b, and 1016c where pieces 1016a and 1016b abut at joint 1018 over the headlap of the lower layer. Piece 1016b overlaps a portion of 1016a such that an upper edge of piece 1016c extends to the dashed line 1020. In a particular instance, the joint formed between adjacent pieces can be flush, such that the pieces do not overlap one another. In another particular instance, the joint formed between adjacent pieces can overlap. Partial stacking of the layers as illustrated by finger 1012d may enhance aesthetic presentation of the shingle, more closely simulating natural materials. It is noted that the scope of the disclosure is intended to cover fingers having various joints and component arrangements.

Figure 15:
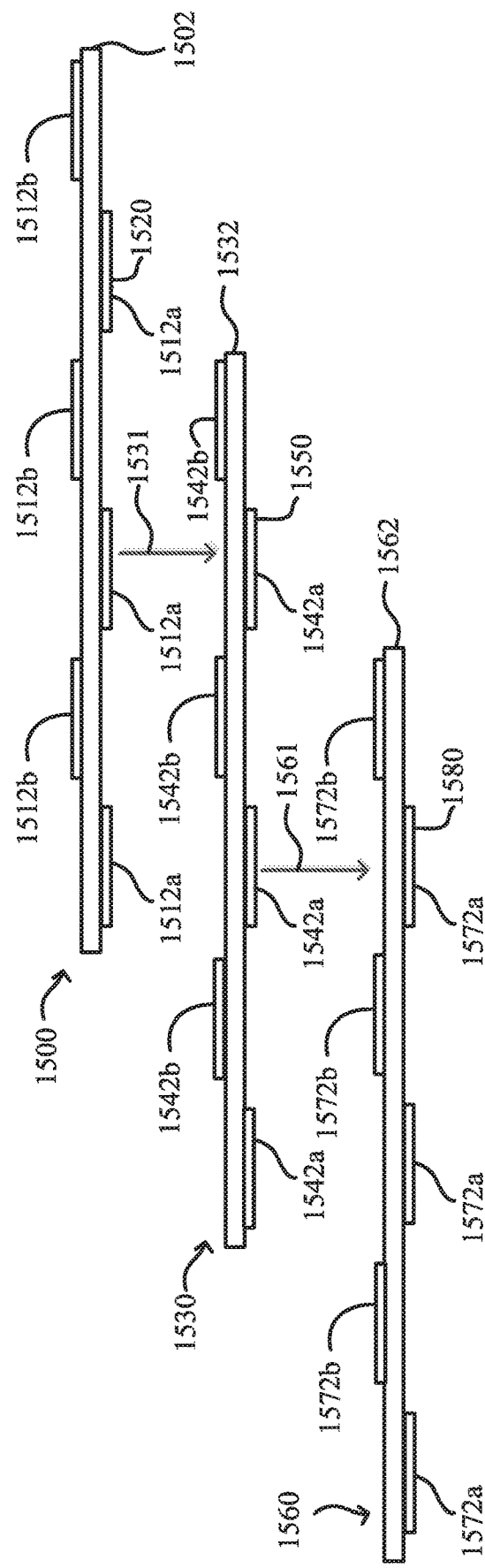
FIG. 15 includes a front side elevation view of a roofing shingle in accordance with an embodiment.

In an embodiment, illustrated in FIG. 15, at least one of the fingers 1512a can be disposed along a back side 1520 of the lower layer 1502 of the shingle 1500. That is, the embodiment illustrated, for example, in FIG. 1 can be reversed such that at least one of the fingers 1512a extends along a lower surface of the shingle 1500. In this regard, the finger 1512a may be hidden from view when installed. In a particular embodiment, at least one finger 1512b is disposed on an opposite major surface of the shingle 1500. As discussed in greater detail below, the fingers can assist with shingle alignment during installation. Underlying and overlying fingers can permit enhanced alignment in both the X- and Y-directions. In certain instances, the finger(s) on one shingle can be staggered with respect to fingers on underlying or overlying shingles. That is, upon proper alignment, the back side finger 1512a can be positioned along the lower layer of an underlying shingle without contacting a finger.

In other instances, the finger(s) on one shingle can be adapted to align with fingers (or portions of fingers) of an underlying shingle. For example, in FIG. 15 is illustrated a side perspective view of shingles 1500, 1530, and 1560. At least one of the fingers 1512a, 1542a, and 1572a can be disposed along a back side 1520, 1550, and 1580 of a lower layer 1502, 1532, and 1562, of the shingle 1500, 1530, and 1590, respectively, and at least one of the fingers 1512b, 1542b, and 1572b can be disposed on an opposite major surface of the shingle 1500, 1530, and 1590, respectively. The shingles can be arranged in a staggered formation as shown in FIG. 15 such that shingle 1530 can be placed over shingle 1560 in a placement direction 1561, and shingle 1500 can be placed over shingle 1530 in a placement direction 1531. Although shingles 1500, 1530, and 1560 are shown with three fingers on each side, more or fewer fingers may be included on each side, and the total number of fingers on one side may be different than the total number of fingers on the other side. The staggered formation may assist a user in placing the shingles in a predetermined arrangement. The staggered formation may also improve sealing between the staggered shingles by reducing gaps and surface protrusions. The staggered formation also provides the benefit of allowing the shingles to fit together flatly in packaging, such as with a back-to-back or a face-to-face arrangement.

Referring again to FIG. 1, in a particular embodiment, at least one of the fingers 112 extends parallel with respect to the shingle width, W. That is, a centerline 114 of the at least one finger 112 can be parallel with the shingle width, W. The at least one finger 112 can also extend parallel with the width of the tab 108. In another particular embodiment, the finger 112 can be canted relative to the shingle width, W. That is, the centerline 114 of the at least one finger 112 can be angularly offset from W. In an embodiment, the at least one finger 112 can be offset from W by at least 1°, at least 2°, at least 3°, at least 4°, at least 5°, at least 10°, or at least 25°. In another embodiment, the angular offset is less than 90°, less than 75°, less than 50°, or less than 30°. Moreover, the angular offset can be in a range between and including any of the values described above. For example, the angular offset between the at least one finger 112 and W can be within a range between and including 2° and 80°, within a range between and including 5° and 50°, or within a range between and including 10° and 25°. In embodiments where multiple fingers 112 are offset from W, the different fingers 112 can be offset from W by different amounts. For example, a first finger 112 can be offset by 1° and a second finger 112 on the same shingle 100 can be offset by 25°. Such varying angular offset may break apart visual consistency along an array of roofing shingles, rendering the appearance of a more natural finish.

In an embodiment, at least one of the fingers 112 extends across the entire width, W, of the shingle 100. In another embodiment, all of the fingers 112 extend across the entire width, W. In a further embodiment, at least one of the fingers 112 extends across the shingle 100 a distance less than W, such as no greater than 99% W, no greater than 95% W, no greater than 90% W, no greater than 80% W, no greater than 70% W, no greater than 60% W, no greater than 50% W, or no greater than 25% W. The at least one finger 112 extends at least 1% W, such as at least 5% W, or even at least 10% W in accordance with other embodiments. In yet another embodiment, all of the fingers 112 extend a distance less than W, such as no greater than 99% W, no greater than 95% W, no greater than 90% W, no greater than 80% W, no greater than 70% W, no greater than 60% W, no greater than 50% W, or no greater than 25% W.

The fingers 112 define a length, $L_F$, as measured perpendicular to the width, W. In an embodiment, $L_F$ is less than a length, $L_T$, of the underlying tab 108. For example, $L_F$ can be less than 99% $L_T$, less than 95% $L_T$, less than 90% $L_T$, less than 75% $L_T$, or less than 50% $L_T$. In an embodiment, $L_F$ can be no less than 1% $L_T$. In such a manner, portions of the underlying tab 108 can be seen on opposite sides of the finger 112. In an embodiment, the length, $L_F$, of all of the fingers 112 can be the same. In another embodiment, different fingers 112 along the same shingle 100 can have different lengths.

Figure 5:
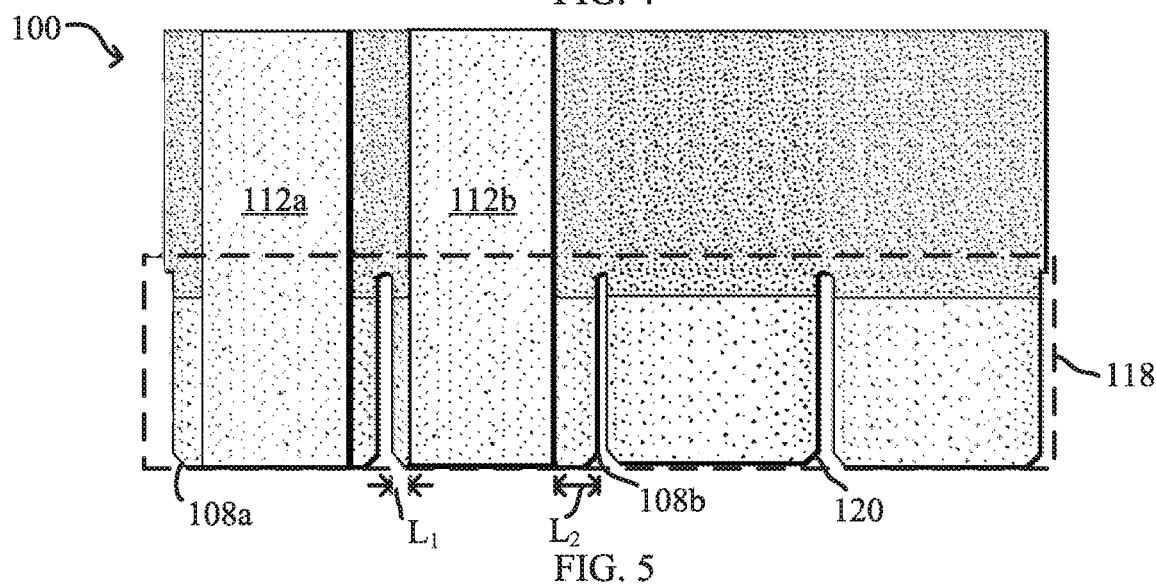

In an embodiment, at least one, such as all, of the fingers 112 can be centered along the underlying tab 108 of which the finger 112 overlies. In another embodiment, at least one, such as all, of the fingers 112 can be offset from a central position of the underlying tab 108. For example, referring to FIG. 5, finger 112a is centered with respect to the underlying tab 108a while finger 112b is offset from a central position of underlying tab 108b. In this regard, a length, $L_1$, on a first side of the finger 112b can be different from a length, $L_2$, on a second side of the finger 112b. In an embodiment, $L_1$ can be no less than 0.01 $L_2$, no less than 0.1 $L_2$, or no less than 0.5 $L_2$ and no greater than 100 $L_2$, no greater than 50 $L_2$, no greater than 10 $L_2$, or no greater than 2 $L_2$. Offsetting, or staggering, the fingers 112 relative to the tabs 108 can break apart patterns formed along roofs over large areas—making for a more natural visual appearance.

The shingle 100 can define an exposure zone 118 extending in a width direction, W, from the butt end 116 toward the headlap 106. The exposure zone 118 is configured to be exposed to the environment when the shingle 100 is installed on a roof.

Figure 6:
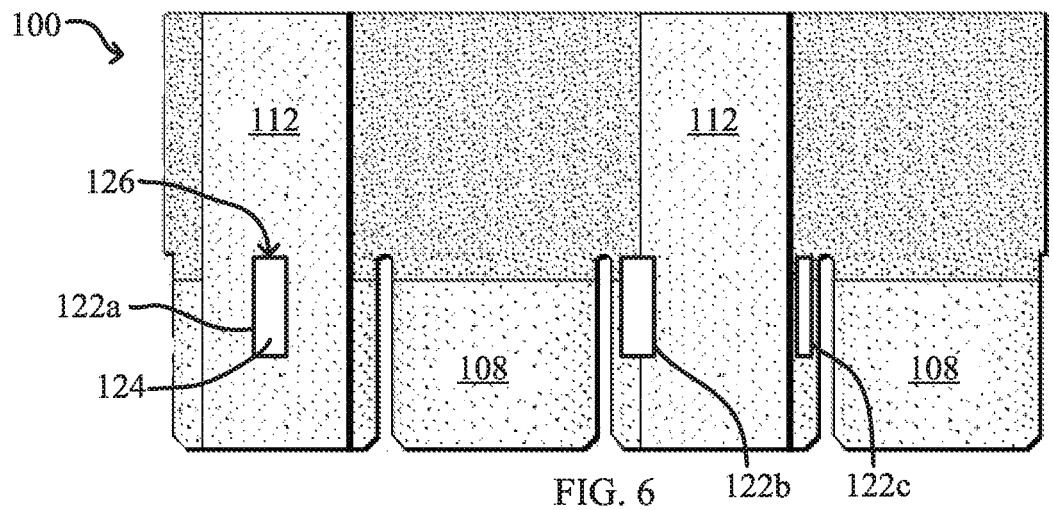

Referring to FIG. 6, and in accordance with certain embodiments, the shingle 100 can further include an alignment feature 122 adapted to permit alignment of adjacent roofing shingles, in at least one of an X- and Y-direction, during installation thereof along a roof (not illustrated). The X-direction may be parallel with width, W, of the shingle 100 while the Y-direction is parallel with the length, L, thereof. The alignment feature 122 may be positioned on (122a), partially on (122b), or adjacent to (122c) one or more of the fingers 112 such that it is partially exposed, fully exposed, or not exposed after installation on a roof. That is, the alignment feature 122 may be at least partially, such as fully, positioned in the exposure zone 118 such that it is exposed after installation on a roof. Alternatively, the alignment feature 122 can be positioned in a hidden region of the shingle 100.

In an embodiment, the alignment feature 122 can include a body 124, such as a discrete body, disposed along the shingle 100. The discrete body can be removable from the shingle 100. The discrete body can define at least one side 126 which indicates a location for a corresponding edge of an adjacently positioned shingle 100 in either or both the X- and Y-directions. In a particular embodiment, proper alignment between adjacent shingles can cause one or more tactile indications, visual indications, or a combination thereof to an installer. For example, a first shingle 100 may positioned along a roof. A second shingle 100 can be brought toward the first shingle 100 and repositioned until the alignment feature 122 indicates proper alignment, after which time the second shingle 100 can be fastened to the roof.

In another embodiment, the alignment feature can include a body 124 having a first major surface and a second major surface spaced apart from one another by a thickness defining at least three sides of the body 124 extending between the major surfaces. At least one of the three sides of the body 124 can be positioned to indicate an X- or Y-directional alignment between adjacent shingles 100.

The alignment feature 122 can be attached to the shingle 100, for example, by an adhesive, mechanical fastener, mechanical deformation, threaded or non-threaded fasteners, or any combination thereof. In certain embodiments, the alignment feature 122 can be removable from the shingle 100. In other embodiments, the alignment feature 122 can be integrally attached to the shingle 100 and not removable therefrom.

In a particular instance, the alignment feature 122 has a surface area, as viewed normal to an uppermost surface of the shingle 100, that is less than a surface area of one of the fingers 112. For example, the surface area of the alignment feature can be less than 99% the surface area of one finger 112, less than 90% the surface area of one finger 112, less than 75% the surface area of one finger 112, less than 50% the surface area of one finger 112, less than 25% the surface area of one finger 112, or less than 10% the surface area of one finger 112. The alignment feature can further have a surface area less than 99% a surface area of one tab 108, less than 90% the surface area of one tab 108, less than 75% the surface area of one tab 108, less than 50% the surface area of one tab 108, less than 25% the surface area of one tab 108, or less than 10% the surface area of one tab 108.

The alignment feature 122 can have a width less than the width, W, of the shingle 100. For example, the alignment feature 122 can have a width that is less than 99% W, less than 95% W, less than 90% W, less than 75% W, less than 50% W, less than 25% W, less than 10% W, or less than 1% W. Further, the alignment feature 122 can have a length that is less than the length, L, of the shingle 100. For example, the alignment feature 122 can have a length less than 99% L, less than 95% L, less than 90% L, less than 75% L, less than 50% L, less than 25% L, less than 10% L, or less than 1% L.

In certain embodiments, the alignment feature 122 has a thickness, as measured perpendicular to both the length and the width of the shingle 100, less than a thickness of at least one, such as both, the lower layer 102 and upper layer 104. For example, the alignment feature 122 thickness can be less than 99% the thickness of the lower or upper layers 102 or 104, less than 90% the thickness thereof, less than 80% the thickness thereof, less than 70% the thickness thereof, less than 60% the thickness thereof, or less than 50% the thickness thereof. In an embodiment, the alignment feature 122 has a thickness no less than 1% the thickness of the lower or upper layers 102 or 104, no less than 5% the thickness thereof, no less than 10% the thickness thereof, or no less than 25% the thickness thereof.

In an embodiment, at least one of the fingers of the shingle can act as an alignment feature. Referring to FIGS. 13 and 14, fingers which also act as alignment features are designated 1312a and 1312c while fingers which do not act as alignment features are designated 1312b and 1312d. In an embodiment, fingers 1312a can act as alignment features while extending from the butt end 1320 or a location adjacent thereto; fingers 1312c can act as alignment features while extending from the headlap 1306; fingers 1312b extend an entire width of the shingle 1300; and fingers 1312d are disposed along the headlap 1306 in an unexposed region and without assisting in alignment of adjacent shingles 1300. Fingers 1312d can alter texture or surface appearance of neighboring shingles which are deformed by finger 1312d. It is noted that fingers 1312c and 1312d can be offset from alignment with adjacent tabs, such that, for example, the fingers 1312c or 1312d has a centerline aligning with the slot located between adjacent tabs.

At least one finger 1312a can terminate a distance offset from an edge of the shingle 1300, forming a surface or edge by which future shingle placement can be determined. As illustrated in FIG. 13, fingers 1312a terminate within the headlap 1306 of the lower layer 1302 prior to contacting an edge 1304 of the shingle 1300. Finger 1312b meanwhile extends a full width of the shingle 1300. The fingers 1312a and 1312c may assist in alignment of adjacent shingles (FIG. 14) during installation. In a particular embodiment, the finger 1312c can extend from the edge 1304 of the shingle 1300 (FIG. 13). In another embodiment, the finger 1312c can extend from a location adjacent to the edge 1304 (FIG. 14). That is, the finger 1312c can be spaced apart from the edge 1304. Similar to fingers 1312a, the finger 1312c can assist in alignment of adjacent shingles during installation.

Referring to FIG. 14, the butt end 1320 of an upper shingle 1300a can be aligned with, or even contact, one of the fingers 1312a, 1312b, or 1312c of the lower shingle 1300b to align adjacent shingles with respect to one another. Lateral placement of overlapping shingles (e.g., shingles 1300a and 1300b) can be performed in any manner as understood by those of ordinary skill in the art. For example, the tabs of overlapping shingles can align such that a centerline of a tab of one shingle aligns with a tab of another shingle. In another embodiment, the tab of one shingle can align with the slot of an overlapping shingle (FIG. 14). In yet a further embodiment, a tab centerline can be offset from both a slot of an overlapping shingle and a centerline of a tab of an overlapping shingle. In certain embodiments, overlying shingles can extend to, or even into, slots of underlying shingles. In other embodiments, overlying shingles can terminate prior to overlapping the slots of underlying shingles. Skilled artisans will recognize after reading the entire disclosure contained herein that arrangement of overlapping shingles can occur in various different configurations beyond the embodiment illustrated in FIG. 14.

As illustrated in FIGS. 13 and 14, at least one of the fingers can overhang the lower layer 1302. For example, at least one of fingers 1312a or 1312b can overhang the butt end 1320. Alternatively, at least one of fingers 1312b, 1312c, or 1312d can overhang edge 1304 (not illustrated). The overhang length can be at least 1% the width of the finger, as measured parallel with the width of the shingle, at least 2% the width of the finger, at least 3% the width of the finger, at least 4% the width of the finger, at least 5% the width of the finger, at least 10% the width of the finger, or at least 50% the width of the finger. In an embodiment, the overhang length is less than 100% the width of the finger, less than 99% the width of the finger, or less than 90% the width of the finger.

It will be understood after reading the entire specification that the relative arrangement, size, shape, and placement of at least one of the fingers, tabs, alignment features, headlaps, or otherwise can be changed or combined with fingers, tabs, alignment features, headlaps, or otherwise having different relative arrangements, sizes, shapes, and placements. That is, the disclosure is not intended to be limited to only those exemplary embodiments described, but instead can further include combinations and subcombinations of embodiments, along a same shingle or between different shingles in a same array of shingles.

Referring again to FIG. 1, the shingle 100 can include a shadow formation 120 disposed at least partially in the exposure zone 118. In an embodiment, the shadow formation 120 can terminate within the exposure zone 118, not extending into the headlap 106. The shadow formation 120 can have a width, $W_S$, that is equal to, less than, or greater than a width, $W_E$, of the exposure zone 118. In some embodiments, the shadow formation 120 may vary in width by at least about 2%, such as at least about 5%, at least about 10%, or even at least about 20%. In other embodiments, the shadow formation 120 may vary in width by not greater than about 50%, such as not greater than about 40%, not greater than about 30%, or even not greater than about 25%. The shadow formation 120 may cover at least 1% of a surface area of the exposure zone 118, such as at least 2%, at least 5%, at least 10%, or even at least 25%. In an embodiment, the shadow formation 120 covers no greater than 50% of the surface area of the exposure zone 118. In an embodiment, the shadow formation 120 simulates a cutout, slit, slot, edge, thickness, or other suitable texture or orientation of the shingle components. The shadow formation 120 can extend to the headlap 106 in certain embodiments.

The shadow formation 120 can include at least one component that is straight, curved, or has a geometric shape, profile, or design, or is a combination of multiple geometric shapes. The shadow formation 120 may be continuous or include two or more disconnected components. The shadow formation 120 may additionally oscillate or vary in width or length along any portion therealong.

The shadow formation 120 and the exposure zone 118 may differ from one another in color. A "color" of granules may include a single color or a mixture of two or more types of granules of different color to make an overall blend of color. More than one blend may be used on areas of a roofing product.

Regarding coloration of the granules, CIELAB is the second of two systems adopted by CIE in 1976 as models that better showed uniform color spacing in their values. CIELAB is an opponent color system based on the earlier (1942) system of Richard Hunter called L, a, b. In some embodiments, the shadow formation 120 and the exposure zone 118 may differ from each other in color by at least 2 L* CIE color units, such as at least 5 L* CIE color units, at least 10 L* CIE color units, or even at least 15 L* CIE color units. In other embodiments, the shadow formation 120 can include multiple shadowlines which may differ from each other in color by not greater than 50 L* CIE color units, such as not greater than 40 L* CIE color units, not greater than 30 L* CIE color units, or even not greater than 20 L* CIE color units. The color differential also may be within a range defined by any of these minimum and maximum values. Furthermore, the shadow formation 120 can be darker or lighter than the exposure zone 118. It will be understood that the color contrast between the shadow formation 120 and the exposure zone 118 may be in either lightness or darkness, but also may include a chromatic aspect.

In an embodiment, the shingle 100 can further include a reinforcement material (not illustrated) of a substantially thinner dimension as compared to the lower layer 102. The reinforcement material can be coupled to an exterior surface of the shingle 100 and can extend at least substantially between opposite lateral edges of the shingle 100. The reinforcement material can include a scrim, fabric, mesh, film, paper, foil, or any combination thereof. In embodiments including scrim, fabric, or mesh, the reinforcement material can be woven or non-woven. The reinforcement material can increase structural stability of the shingle. The reinforcement material can also decrease impact damage caused by falling objects such as hail or tree limbs by decreasing impact absorption to the shingle layers. High strength shingles are described in U.S. Pat. Nos. 9,121,178 and 5,822,943, and U.S. Patent Publication No. 2016/0017607, which are all incorporated herein in their entirety.

In an embodiment, the shingle 100 further includes a longitudinal fastening zone between a left and right edges of the shingle, generally intermediate an upper edge and the butt end 116. The reinforcement material can be at least partially lower than the fastening zone, toward the butt end 116 of the shingle 100, or at least partially in the fastening zone toward the upper edge of the shingle 100.

Manufacture of the shingle 100 can occur, for example, by forming the lower layer 102 including a headlap 106, a butt end 116, and tabs 108 extending therebetween. Fingers 112 can be formed independently and attached to the lower layer 102 in an arrangement as discussed in accordance with one or more of the embodiments described above. The method can further include applying granules to a portion, or all, of the shingle 100. The granules can all be the same, or similar, as one another, or include different types of granules, varying in color, size, shape, another similar attribute, or any combination thereof. For example, in an embodiment, at least a portion of the lower layer 102 can include a first type of granules and at least a portion of the upper layer 104 can include a second type of granule that is different from the first type of granule. In another embodiment, the alignment feature 122 can include a third type of granule different from at least one, such as both, the first and second types of granules. The difference between the third type of granule and at least one of the first and second types of granules may be, for example, color, size, material, texture, surface finish, or any combination thereof. In another embodiment, the third type of granule can be the same, or substantially the same, as any, or both, the first and second types of granules. In an embodiment, the method further includes applying asphalt to the shingle 100; application of which can be performed prior to applying the granules.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A roofing shingle consisting of: a lower layer including a headlap and a plurality of tabs extending from the headlap; and an upper layer including one or more fingers, wherein the one or more fingers are disconnected from one another, and wherein each of the one or more fingers is disposed on one tab of the plurality of tabs, wherein the total number of the plurality of tabs is different than the total number of the one or more fingers.

Embodiment 2

A roofing shingle comprising: a lower layer including a headlap and a plurality of tabs extending from the headlap; and one or more fingers disconnected from one another, wherein each of the one or more fingers is disposed on one tab of the plurality of tabs, wherein the total number of the plurality of tabs is different than the total number of the one or more fingers, and wherein the lower layer is a lowermost layer of the roofing shingle.

Embodiment 3

The roofing shingle of any one of the preceding embodiments, wherein the total number of the plurality of tabs is greater than the total number of fingers.

Embodiment 4

The roofing shingle of any one of the preceding embodiments, wherein a ratio of the total number of the plurality of tabs to the total number of fingers is greater than 1:1, at least 1.5:1, or at least 2:1.

Embodiment 5

The roofing shingle of any one of the preceding embodiments, wherein at least one of the one or more fingers extends an entire width of the lower layer.

Embodiment 6

The roofing shingle of any one of the preceding embodiments, wherein at least one of the one or more fingers extends a distance less than a width of the lower layer.

Embodiment 7

The roofing shingle of any one of the preceding embodiments, wherein the shingle has a butt end, and wherein at least one of the one or more fingers extends from a location adjacent to the butt end to the headlap.

Embodiment 8

The roofing shingle of any one of embodiments 1 to 6, wherein at least one of the one or more fingers extends from the headlap toward a butt end of the shingle.

Embodiment 9

The roofing shingle of any one of embodiments 1 to 6, wherein at least one of the one or more fingers is disposed on the headlap and extends from an upper edge of the shingle toward a butt end of the shingle, the at least one of the one or more fingers having a lower edge that does not extend beyond an upper edge of an exposure zone of the shingle.

Embodiment 10

The roofing shingle of any one of the preceding embodiments, wherein the plurality of tabs includes a first tab, a second tab, and a third tab, and wherein one of the one or more fingers is disposed on each of the first and third tabs.

Embodiment 11

The roofing shingle of embodiment 10, wherein at least one of the first, second, and third tabs is essentially free of the one or more fingers.

Embodiment 12

The roofing shingle of any one of the preceding embodiments, wherein the roofing shingle has an exposure zone extending between a butt end of the shingle and the headlap of the lower layer, and wherein a shadow formation is disposed in the exposure zone, the shadow formation having a different color than the remaining portions of the exposure zone.

Embodiment 13

The roofing shingle of embodiment 12, wherein the shadow formation does not extend into the headlap portion of the lower layer.

Embodiment 14

The roofing shingle of any one of embodiments 12 and 13, wherein the shadow formation and the remaining exposure zone differ from each other in color by at least about 2 L*CIE color units and not greater than about 50 L*CIE color units.

Embodiment 15

The roofing shingle of any one of the preceding embodiments, wherein at least a portion of the lower layer comprises a first type of granule, and wherein at least a portion of the upper layer comprises a second type of granule that differs from the first type of granule.

Embodiment 16

The roofing shingle of any one of the preceding embodiments, wherein adjacent tabs of the lower layer are spaced apart from one another by cut outs extending from a location adjacent to a butt end of the lower layer to the headlap of the lower layer.

Embodiment 17

The roofing shingle of embodiment 16, wherein at least one of the cut outs extends an entire distance between the butt end and the headlap.

Embodiment 18

The roofing shingle of any one of the preceding embodiments, wherein at least one of the one or more fingers is centered along one of the plurality of tabs.

Embodiment 19

The roofing shingle of any one of the preceding embodiments, wherein at least one of the one or more fingers is offset from a central location of one of the plurality of tabs.

Embodiment 20

The roofing shingle of any one of the preceding embodiments, wherein at least one of the one or more fingers has an exposed surface area less than 99% of a surface area of one of the plurality of tabs, less than 90% of the surface area of one of the plurality of tabs, less than 75% of the surface area of one of the plurality of tabs, or less than 50% of the surface area of one of the plurality of tabs.

Embodiment 21

The roofing shingle of any one of the preceding embodiments, wherein at least one of the one or more fingers is coupled to the lower layer by an adhesive.

Embodiment 22

The roofing shingle of any one of the preceding embodiments, wherein at least one of the one or more fingers is coupled to the lower layer by a mechanical fastener.

Embodiment 23

The roofing shingle of any one of the preceding embodiments, wherein the one or more fingers each have a centerline extending generally along a width dimension of the roofing shingle, and wherein the centerline of at least one of the one or more fingers is angularly offset from the width dimension of the roofing shingle.

Embodiment 24

The roofing shingle of any one of the preceding embodiments, further comprising: an alignment feature disposed in an exposure zone of the roofing shingle, wherein the alignment features is adapted to permit alignment of adjacent roofing shingles during installation on a roof.

Embodiment 25

A roofing shingle comprising: a lower layer including a headlap and a plurality of tabs extending from the headlap; an upper layer including one or more disconnected fingers; and an alignment feature disposed in an exposure zone of the roofing shingle.

Embodiment 26

The roofing shingle of any one of embodiments 24 and 25, wherein at least one of the one or more fingers comprises the alignment feature.

Embodiment 27

The roofing shingle of any one of embodiments 24 and 25, wherein the alignment feature comprises at least one of the one or more fingers.

Embodiment 28

The roofing shingle of any one of embodiments 24 and 27, wherein the alignment feature is disposed on the one or more disconnected fingers.

Embodiment 29

The roofing shingle of any one of embodiments 24-28, wherein the alignment feature extends into a hidden zone of the roofing shingle such that at least a portion of the alignment feature is covered in the installed state.

Embodiment 30

The roofing shingle of any one of embodiments 24-29, wherein the roofing shingle defines an X-direction parallel with a width of the roofing shingle and a Y-direction parallel with a length of the roofing shingle, and wherein the alignment feature is adapted to align adjacent roofing shingles in at least one of the X- and Y-directions.

Embodiment 31

The roofing shingle of any one of embodiments 24-30, wherein the alignment feature is attached to the roofing shingle by an adhesive.

Embodiment 32

The roofing shingle of any one of embodiments 24-31, wherein the alignment feature has a total surface area less than a total surface area of the one or more fingers.

Embodiment 33

The roofing shingle of any one of embodiments 24-32, wherein the alignment feature has a total surface area less than a total surface area of the plurality of tabs.

Embodiment 34

The roofing shingle of any one of embodiments 24-33, wherein the alignment feature comprises a third type of granule, and wherein at least a portion of the upper layer comprises a second type of granule that differs from the third type of granule.

Embodiment 35

The roofing shingle of any one of embodiments 24-34, wherein the alignment feature comprises a color different than the one or more fingers.

Embodiment 36

The roofing shingle of any one of embodiments 24-35, wherein the alignment feature comprises a same color as the one or more fingers.

Embodiment 37

The roofing shingle of any one of embodiments 24-36, wherein the alignment feature extends a distance less than a width of the roofing shingle.

Embodiment 38

The roofing shingle of any one of embodiments 24-37, wherein the alignment feature comprises a body having an edge, and wherein the edge of the body indicates proper alignment between adjacent shingles to be positioned during installation.

Embodiment 39

The roofing shingle of embodiment 38, wherein indication of proper alignment between adjacent shingles is adapted to occur by one or more tactile indications, visual indications, or a combination thereof.

Embodiment 40

The roofing shingle of any one of embodiments 24-39, wherein a thickness of the alignment feature is no greater than a thickness of the lower layer, the upper layer, or both.

Embodiment 41

The roofing shingle of any one of embodiments 24-40, wherein the alignment feature comprises a body having a first major surface and a second major surface spaced apart from one another by a thickness, and at least three sides extending between the first and second major surfaces, wherein at least one of the at least three sides provides proper alignment between adjacent shingles during installation n a roof.

Embodiment 42

The roofing shingle of any one of embodiments 24-41, wherein the alignment feature has a thickness less than a thickness of the lower layer.

Embodiment 43

The roofing shingle of any one of the preceding embodiments, further comprising: an impact resistant material coupled with the lower layer.

Embodiment 44

The roofing shingle of embodiment 43, wherein the impact resistant material comprises a scrim, fabric, mesh, film, paper, foil, or any combination thereof.

Embodiment 45

The roofing shingle of embodiment 44, wherein the scrim, fabric, or mesh is woven or non-woven.

Embodiment 46

The roofing shingle of embodiment 45, wherein the woven or non-woven scrim, fabric, or mesh comprises synthetic fibers, natural fibers, or a combination thereof.

Embodiment 47

The roofing shingle of embodiment 46, wherein the synthetic fibers comprise glass fibers, polymeric fibers, or a combination thereof.

Embodiment 48

The roofing shingle of embodiment 47, wherein the polymeric fibers comprise polyester fibers, polyolefin fibers, polyimide fibers, polyacrylate, nylon fibers, or a combination thereof.

Embodiment 49

The roofing shingle of any one of embodiments 43 to 48, wherein the impact resistant material is disposed along a lowermost side of the lower layer.

Embodiment 50

The roofing shingle of any one of the preceding embodiments, wherein at least one of the fingers comprises an impact resistant component, such as a rubber.

Embodiment 51

A roofing shingle comprising: a lower layer including a headlap and a plurality of tabs extending from the headlap; an upper layer including one or more fingers, wherein the one or more fingers are disconnected from one another, and wherein each of the one or more fingers is disposed on one tab of the plurality of tabs; and an alignment feature disposed on the upper layer, wherein at least a portion of the alignment feature is in an exposure zone of the roofing shingle, and wherein the alignment feature comprises a body having an edge adapted to indicate proper alignment between adjacent shingles to be positioned during installation on a roof.

Embodiment 52

The roofing shingle of any one of embodiments 2 to 51, further comprising: an at least partially exposed generally longitudinal reinforcement material of a substantially thinner dimension as compared to the lower layer, wherein the reinforcement material is coupled to an exterior surface of the shingle and extends at least substantially between opposite lateral edges of the shingle.

Embodiment 53

The roofing shingle of embodiment 52, wherein the shingle further comprises a longitudinal fastening zone between a right edge and a left edge of the shingle, generally intermediate an upper edge and the butt end of the shingle, the reinforcement feature being at least partially lower than the fastening zone, toward the butt end of the shingle or at least partially in the fastening zone toward the upper edge of the shingle.

Embodiment 54

The roofing shingle of embodiment 53, wherein the reinforcement material is coupled to a front exterior surface of the shingle.

Embodiment 55

The roofing shingle of embodiment 53, wherein the reinforcement material is coupled to a rear exterior surface of the lower layer.

Embodiment 56

The roofing shingle of embodiment 55, wherein the reinforcement material is disposed between a front surface of the lower layer and at least one of the one or more fingers.

Embodiment 57

The roofing shingle of embodiment 53, wherein the reinforcement material is coupled to a rear exterior surface of the shingle.

Embodiment 58

The roofing shingle of any one of embodiments 52-57, wherein the reinforcement material comprises a scrim, fabric, mesh, film, paper, foil, or any combination thereof.

Embodiment 59

The roofing shingle of embodiment 58, wherein the scrim, fabric, or mesh is woven or non-woven.

Embodiment 60

The roofing shingle of embodiment 59, wherein the reinforcement material is disposed along a lowermost side of the lower layer.

Embodiment 61

The roofing shingle of any one of embodiments 2-60, wherein at least one of the one or more fingers comprises a layered construction including at least two layers coupled together.

Embodiment 62

The roofing shingle of embodiment 61, wherein at least two of the at least two layers share a centerline extending in a width direction of the shingle.

Embodiment 63

The roofing shingle of any one of embodiments 61 and 62, wherein at least two of the at least two layers are offset relative to one another such that the at least two layers do not share a centerline.

Embodiment 64

The roofing shingle of any one of embodiments 61-63, wherein at least two of the at least two layers have different widths, lengths, thicknesses, or a combination thereof.

Embodiment 65

The roofing shingle of any one of embodiments 61-64, wherein the at least two layers comprise at least three layers, at least four layers, at least five layers, or even at least ten layers.

Embodiment 66

The roofing shingle of any one of embodiments 61-65, wherein the at least two layers are coupled together by an adhesive, a mechanical fastener, a mechanical deformation, or a combination thereof.

Embodiment 67

The roofing shingle of any one of embodiments 61-66, wherein the at least two layers comprises: a first layer; and a second layer, wherein the second layer is at least partially disposed on the first layer.

Embodiment 68

The roofing shingle of embodiment 67, wherein the first layer has an area less than an area of the second layer, wherein the first layer has an area approximately equal to an area of the second layer, or wherein the first layer has an area greater than an area of the second layer.

Embodiment 69

The roofing shingle of any one of embodiments 67 and 68, wherein a portion of the first layer lies along a same plane as a portion of the second layer.

Embodiment 70

The roofing shingle of any one of embodiments 67-69, wherein the at least two layers further comprises: a third layer disposed on at least one of the first and second layers.

Embodiment 71

The roofing shingle of embodiment 70, wherein at least a portion of the third layer is disposed along a generally same plane as the second layer.

Embodiment 72

The roofing shingle of any one of embodiments 70 and 71, wherein the third layer is disposed along a same plane as the second layer, and wherein the second and third layers are disposed on the first layer.

Embodiment 73

The roofing shingle of any one of embodiments 67-72, wherein the first and second layers include same colors, granules, textures, or a combination thereof, or wherein the first and second layers include different colors, granules, textures, or a combination thereof.

Embodiment 74

The roofing shingle of any one of embodiments 67-73, wherein one of the first and second layers includes a tapered portion, and wherein the other of the first and second layers is essentially free of a tapered portion.

Embodiment 75

The roofing shingle of any one of embodiments 67-73, wherein the first and second layers each include a tapered portion.

Embodiment 76

The roofing shingle of any one of embodiments 67-75, wherein the first and second layers extend same or different widths across the shingle.

Embodiment 77

The roofing shingle of any one of embodiments 67-76, wherein the first and second layers extend same or different lengths across the shingle.

Embodiment 78

The roofing shingle of any one of embodiments 67-77, wherein the first layer is at least partially hidden by the second layer, when the shingle is viewed at an angle normal to a major surface thereof.

Embodiment 79

The roofing shingle of any one of embodiments 67-77, wherein at least 10% of an area of the first layer is exposed when viewed at an angle normal to a major surface of the shingle, at least 20% of the area is exposed, at least 30% of the area is exposed, at least 40% of the area is exposed, at least 50% of the area is exposed, at least 60% of the area is exposed, at least 70% of the area is exposed, at least 80% of the area is exposed, or at least 90% of the area is exposed.

Embodiment 80

The roofing shingle of any one of embodiments 67-79, wherein the first and second layers have different thicknesses or similar thicknesses.

Embodiment 81

The roofing shingle of any one of the preceding embodiments, wherein at least one of the one or more fingers is disposed at least partially along a lowermost surface of the lower layer.

Embodiment 82

The roofing shingle of any one of embodiments 2-81, wherein at least one of the one or more fingers has a rectangular profile.

Embodiment 83

The roofing shingle of any one of embodiments 2-81, wherein at least one of the one or more fingers has a non-rectangular profile.

Embodiment 84

The roofing shingle of embodiment 83, wherein the non-rectangular profile includes a tapered portion having a linear or curvilinear taper profile.

Embodiment 85

The roofing shingle of embodiment 84, wherein the tapered portion extends partially along a width of the shingle.

Embodiment 86

The roofing shingle of embodiment 84, wherein the tapered portion extends along an entire width of the shingle.

Embodiment 87

An array of roofing shingles comprising: a first roofing shingle in accordance with any one of embodiments 25-86; and a second roofing shingle in accordance with any one of embodiments 25-86, wherein the first and second roofing shingles are disposed adjacent to one another such that the alignment feature of at least one of the first and second roofing shingles aligns the first and second roofing shingles.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:
1. A roofing shingle, comprising:
a lowermost layer including a headlap and a plurality of tabs extending equidistant from the headlap, wherein adjacent tabs are divided by slits that extend from a butt end of the lowermost layer and at least to the headlap, wherein the lowermost layer comprises an upper surface and a lower surface, wherein the lowermost layer is a single layer in the roofing shingle devoid of additional layers adhered to the lower surface such that the lower surface defines a back of the roofing shingle and wherein the width of the lowermost layer is measured perpendicular to a butt end of the lowermost layer; and a plurality of fingers adhered to the upper surface of the lowermost layer and entirely disconnected from one another such that no part of one finger contacts another finger, wherein each of the plurality of fingers is disposed on and centered along one tab of the plurality of tabs;

wherein a first finger of the plurality of fingers extends from the butt end of the lowermost layer and does not extend along the full width of the lowermost layer;

wherein a second finger of the plurality of fingers extends an entire width of the lowermost layer; and wherein a third finger of the plurality of fingers does not extend along the full width of the lowermost layer and extends beyond the butt end of the lowermost layer, such that it overhangs the butt end of the lowermost layer.

2. The roofing shingle of claim 1, further comprising a longitudinal reinforcement material that is thinner than the lowermost layer, wherein the reinforcement material is coupled to an exterior surface of the shingle, and wherein the reinforcement material extends between opposite lateral edges of the shingle.

3. The roofing shingle of claim 2, wherein the shingle further comprises a longitudinal fastening zone which is between a right edge and a left edge of the shingle and between an upper edge and the butt end of the lowermost layer, and wherein the reinforcement material is at least partially in the fastening zone.

4. The roofing shingle of claim 1, wherein at least one of the plurality of fingers comprises a layered construction including at least two layers coupled together.

5. The roofing shingle of claim 4, wherein at least two of the at least two layers coupled together have different widths, lengths, thicknesses, or a combination thereof.

6. The roofing shingle of claim 1, wherein each of the plurality of fingers has a rectangular profile.

7. The roofing shingle of claim 1, wherein a fourth finger of the plurality of fingers is disposed entirely within the headlap of the lowermost layer.

\* \* \* \* \*